Feb. 15, 1949. R. R. RANDALL 2,462,000
NONEQUALIZING-TORQUE DIFFERENTIAL TRANSMISSION
Filed July 7, 1945 2 Sheets-Sheet 1
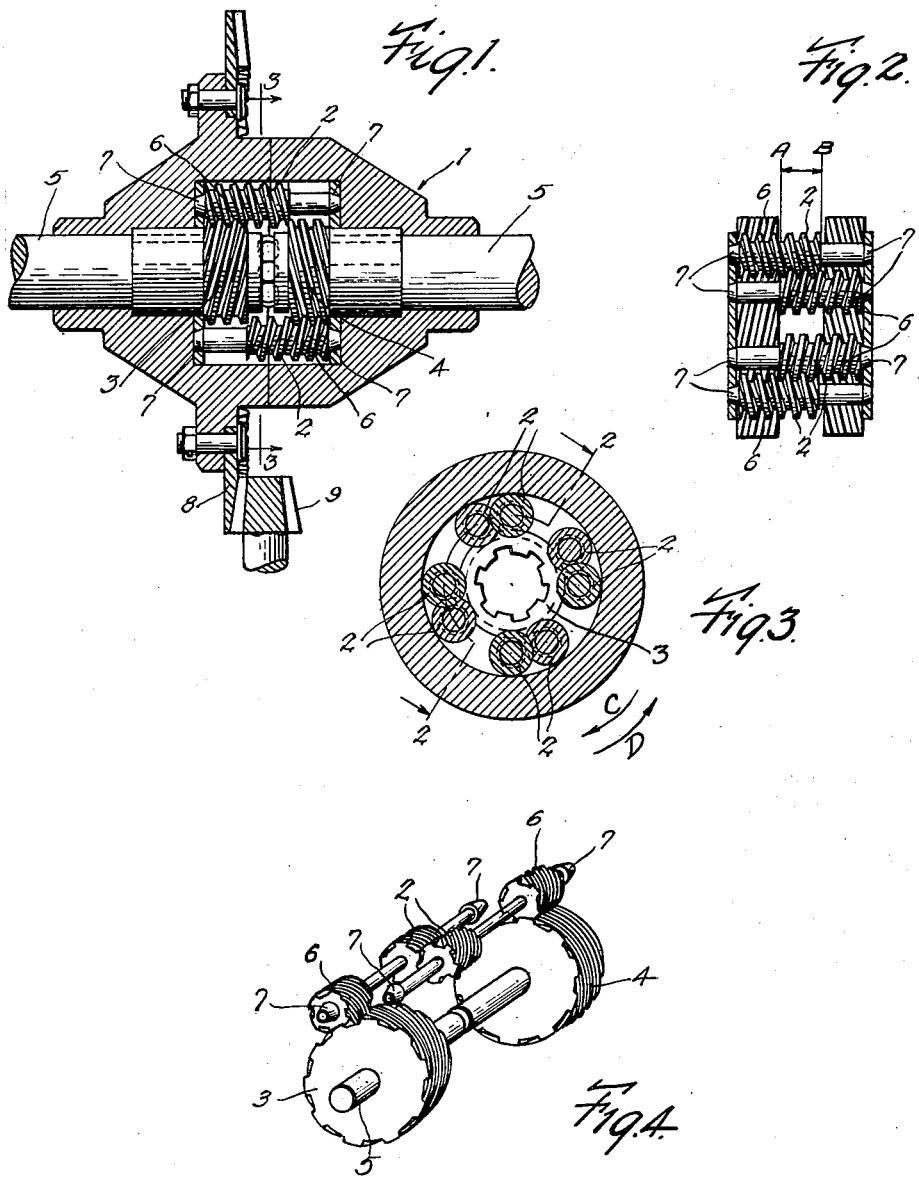
Inventor:
Ralph R. Randall
By Thiess, Olson & Mecklenburger
Attys.

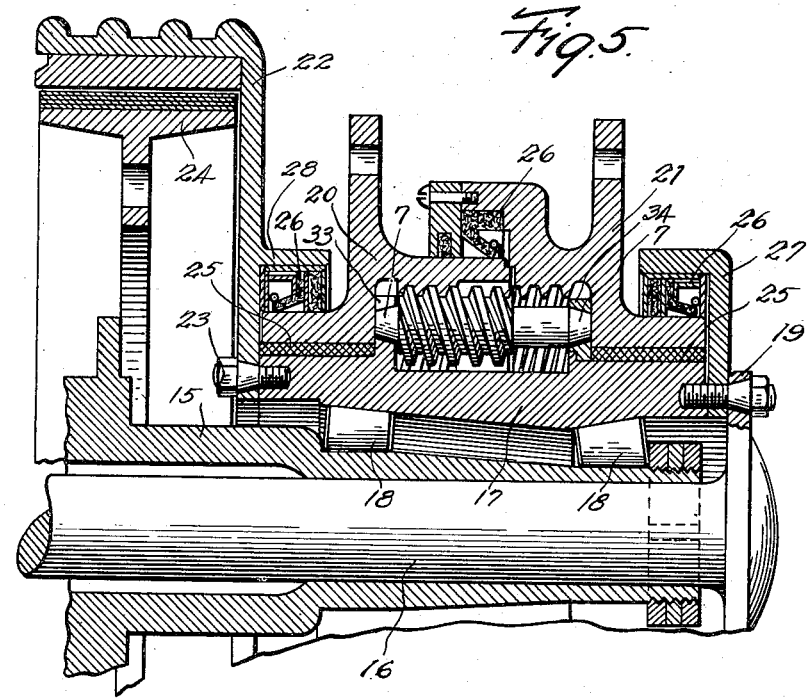

Patented Feb. 15, 1949

2,462,000

UNITED STATES PATENT OFFICE 2,462,000

NONEQUALIZING-TORQUE DIFFERENTIAL TRANSMISSION

Ralph R. Randall, Freeport, Ill., assignor to Dualoc Syndicate, Rockford, Ill., a partnership Application July 7, 1945, Serial No. 603,719

6 Claims. (Cl. 74—715)

My invention relates to non-equalizing torque differential transmissions.

One of the objects of my invention is to provide a compact, efficient, inexpensive, durable, non-equalizing torque differential transmission.

A further object is to provide such a construction, making use of the balancing and unbalancing of endwise pressures on intermeshing helical worm gear elements to control the braking force on aligned coaxial cone bearing brake elements.

A further object is to provide, in combination with the non-equalizing-torque differential indicated, a dual wheel drive.

A further object is to combine with the dual wheel drive a simple and efficient brake.

Further objects and advantages of the invention will be apparent from the description and claims.

In the drawings, in which several embodiments of my invention are shown,

Figure 1 is an axial sectional view of a non-equalizing-torque differential transmission;

Fig. 2 is a somewhat schematic developed section on the line 2—2 of Fig. 3;

Fig. 3 is a section substantially on the line 3—3 of Fig. 1;

Fig. 4 is a schematic perspective view of parts of the transmission;

Fig. 5 is an axial sectional view showing a transmission combined with a dual wheel driven;

Fig. 6 is a schematic developed section on the line 6—6 of Fig. 7; and

Fig. 7 is an end view of the transmission with parts removed, seen from the left of Fig. 5.

Referring to the drawings in detail, and first to Figs. 1-4, incl., the construction shown comprises a non-equalizing-torque differential gearing including a rotatable gear carrier 1, a plurality of pairs of intermeshing helical worm gear elements 2 extending longitudinally from A to B, one of each pair being right-hand and the other being left-hand, rotatably mounted on said gear carrier, with their axes parallel to and eccentric with respect to the axis of said gear carrier 1, a pair of rotatable helical worm gears 3 and 4 coaxial with said gear carrier, a pair of drive axles 5 splined to the worm gears 3 and 4, respectively, and transmission between each pair of helical worm gear elements and said gears. This transmission comprises a plurality of helical worm gear elements 6 rotatable and integral with said first helical worm gear elements, respectively, and meshing with said helical worm gears 3 and 4, respectively, a plurality of cone bearing friction coupler elements 7, one pair for each of said first helical worm gear elements and rotatable therewith, a bevel gear 8 secured to the gear carrier 1 and a bevel pinion 9 meshing with the bevel gear 8. The bevel pinion 9 may be driven from the propeller shaft of a motor vehicle.

The cones of each pair face in opposite directions whereby, when the rotational resistance of the coaxially aligned gears is equalized, the end thrust on said helical worm gear elements is equalized and there is no end thrust on the cone bearing friction coupler elements and whereby, when the rotational resistance of the coaxial gears is unequalized, an unequalized end thrust on the helical worm gear elements results and the cone bearing friction coupler elements are forced into coupling engagement, hindering counter rotation of the helical worm gear elements.

From the above it follows that when the axles 5 which rotate with the two gears, respectively, are connected to the traction wheels (not shown) and when both traction wheels are in nonslipping engagement with the roadway, there will be no end thrust on the cone bearing friction coupler elements 7. The drive effort of the bevel gear 8 exerts a force tending to separate the two gears 3 and 4 if the effort is exerted in the direction of the arrow C of Fig. 3 and tending to force the gears toward each other if the drive effort of the bevel gear tends to turn the traction wheels in the direction of the arrow D.

If one of the drive wheels (not shown) has good traction engagement with the roadway and the other does not, and hence tends to slip, the rotational resistance of the coaxial gears is unequalized and an unequalized end thrust on the helical worm gear elements 2 results, and the cone bearing friction coupler elements 7 are forced into coupling engagement, hindering independent rotation of that traction wheel which does not have good tractive engagement with the roadway.

If both traction wheels have good tractive engagement with the roadway and the direction of the vehicle is being changed, the traction wheels are free to rotate with respect to their proper rolling radius.

The construction shown in Figs. 5, 6 and 7 may be for use with a dual wheel drive in which a pair of traction wheels are mounted on a bearing sleeve 15 extending laterally from the side of the vehicle. This bearing sleeve may carry either a pair of steerable wheels or a pair of non-steerable wheels (not shown). In either case, the wheels may be used either as nondrive wheels or as drive wheels and in both cases will be provided with a differential gearing between the two traction wheels.

The construction shown comprises the bearing sleeve 15, the gear carrier 17 rotatably mounted thereon by means of anti-friction bearings 18, the drive axle 16 extending through the bearing sleeve 15 and having a flange 19 secured to the gear carrier 17, the hubs 20 and 21 on which the dual traction wheels (not shown) are mounted, differential gearing acting between the gear carrier 17 and the two hubs 20 and 21, and an internal brake drum 22 secured to the gear carrier 17 by means of cap screws 23 and controlled by an internal expanding brake 24. Suitable bearing bushings 25 may be provided between the gear carrier 17 and the hubs 20 and 21 of the traction wheels. Suitable oil seals 26 may be provided, one between the two hubs 20 and 21, another between the hub 21 and the flanged collar 27 secured to the gear carrier 17, and another between the hub 20 and a flange 28 on the brake drum.

The non-equalizing-torque transmission between the gear carrier 17 and the two traction wheel hubs 20 and 21 comprises a plurality of pairs of helical worm gear 28a comprising intermeshing helical worm gear elements 29, extending from A—B, meshing with each other in pairs. As each pair of helical worm gears functions in the same manner, a description with respect to one pair only will be given. Each helical worm gear 28a comprises, in effect, two worm gear elements 29 and 30, one element 29 of which meshes with a corresponding element 29 of the other gear of the pair and the other element 30 of which meshes with one or the other of the internal helical worm gears 31 and 32. Each worm gear 28a is provided with a pair of cone bearing friction coupler elements 7, the cones of each pair facing in opposite directions, whereby when the rotational resistance of the coaxially aligned gears 31 and 32 is equalized, the end thrust on the helical worm gear elements is equalized also and there is no end thrust on the cone bearing friction coupler elements 7 and whereby when the rotational resistance of the two coaxial gears 31 and 32 is unequalized, an unequalized end thrust on the helical worm gears 28a results and the cone bearing friction coupler elements 7 are forced into coupling engagement with the flanges 33 and 34 of the gear carrier 17, breaking the oil film and causing a braking effect which hinders or stops counter rotation of the helical worm gear elements.

The action of this non-equalizing-torque differential will be substantially the same as that shown in Figs. 1–4, inclusive.

When the hubs 20 and 21 which rotate with the gears 31 and 32, respectively, are connected to the traction wheels (not shown) and when both traction wheels are in nonslipping engagement with the roadway, there will be no end thrust on the cone bearing friction coupler elements 7. The drive effort of the drive axle 16 exerts a force, tending to separate the gears 31 and 32 if the effort is exerted in one direction and tending to force the gears toward each other if the drive effort tends to turn the traction wheels in the opposite direction.

If one of the drive wheels has good traction engagement with the roadway and the other does not, and hence tends to slip, the rotational resistance of the coaxial gears 31 and 32 is unequalized, and unequalized end thrust on the helical worm gear elements 29 results, and the cone bearing friction coupler elements 7 are forced into coupling engagement, hindering counter rotation of that traction wheel which does not have good tractive engagement with the roadway.

If both traction wheels have good tractive engagement with the roadway and the direction of the vehicle is being changed, the traction wheels are free to rotate with respect to their proper rolling radius.

The brake drum 22, because of the fact that it is secured to the gear carrier 17, will exert a non-equalizing-torque on the two traction wheel hubs in the same manner as is exerted by the driving action of the axle 16.

Since, within limits, the friction between two surfaces of the same kind is in direct proportion to the pressure between them; the amount of friction is independent of the extent of the surfaces in contact and the friction is independent of the velocity when the body is in motion, it follows that by the use of conical bearing friction coupler elements one can vary the pressure normal to the surface of the cone bearing caused by a given end thrust, simply by varying the angle of conicity.

Further modifications will be apparent to those skilled in the art and it is desired, therefore, that the invention be limited only by the scope of the appended claims.

Having thus described my invention, what I claim and desire to secure by Letters Patent is:

1. A non-equalizing-torque differential gearing comprising a rotatable gear carrier, a pair of intermeshing helical worm gear elements, one right-hand and one left-hand, rotatably mounted on said gear carrier with their axes parallel to and eccentric with respect to the axis of said gear carrier, a pair of rotatable helical worm gears coaxial with said gear carrier, force transmitting means between said helical worm gear elements and said gears, respectively, comprising a second pair of helical worm gear elements rotatable with said first helical worm gear elements, respectively, and meshing with said helical worm gears, respectively, and two pairs of cone bearing friction coupler elements, one pair for each helical worm gear element and rotatable therewith, the cones of each pair facing in opposite directions whereby when the rotational resistance of the coaxially aligned gears is equalized, the end thrust on said helical worm gear elements is equalized and there is no end thrust on the cone bearing friction coupler elements and whereby when the rotational resistance of the coaxial gears is unequalized, an unequalized end thrust on the helical worm gear elements results and the cone bearing friction coupler elements are forced into coupling engagement, hindering counter rotation of the helical worm gear elements.

2. A non-equalizing-torque differential gearing comprising a rotatable gear carrier, a plurality of pairs of intermeshing helical worm gear elements, each pair comprising one right-hand and one left-hand element, rotatably mounted on said gear carrier with their axes parallel to and eccentric with respect to the axis of said gear carrier, a pair of rotatable helical worm gears coaxial with said gear carrier, force transmitting means between each pair of helical worm gear elements and said gears, respectively, comprising a second pair of helical worm gear elements rotatable with said first helical worm gear elements, respectively, and meshing with said helical worm gears, respectively, and a plurality of pairs of cone bearing friction coupler elements, one pair for each helical worm gear element and rotatable therewith, the cones of each pair facing in opposite directions whereby when the rotational resistance of the coaxially aligned gears is equalized, the end thrust on said helical worm gear elements is equalized and there is no end thrust on the cone bearing friction coupler elements and whereby when the rotational resistance of the coaxial gears is unequalized, an unequalized end thrust on the helical worm gear elements results and the cone bearing friction coupler elements are forced into coupling engagement, hindering counter rotation of the helical worm gear elements.

3. A non-equalizing-torque differential gearing comprising a rotatable gear carrier, a pair of intermeshing helical worm gear elements, one right-hand and one left-hand, rotatably mounted on said gear carrier with their axes parallel to and eccentric with respect to the axis of said gear carrier, a pair of rotatable internal helical worm gears coaxial with said gear carrier, force transmitting means between said helical worm gear elements and said gears, respectively, comprising a second pair of helical worm gear elements rotatable with said first helical worm gear elements, respectively, and meshing with said helical worm gears, respectively, and two pairs of cone bearing friction coupler elements, one pair for each helical worm gear element and rotatable therewith, the cones of each pair facing in opposite directions whereby when the rotational resistance of the coaxially aligned gears is equalized, the end thrust on said helical worm gear elements is equalized and there is no end thrust on the cone bearing friction coupler elements and whereby when the rotational resistance of the coaxial gears is unequalized, an unequalized end thrust on the helical worm gear elements results and the cone bearing friction coupler elements are forced into coupling engagement, hindering counter rotation of the helical worm gear elements.

4. A non-equalizing-torque differential gearing comprising a rotatable gear carrier, a pair of intermeshing helical worm gear elements, one right-hand and one left-hand, rotatably mounted on said gear carrier with their axes parallel to and eccentric with respect to the axis of said gear carrier, a pair of rotatable helical worm gears coaxial with said gear carrier, force transmitting means between said helical worm gear elements and said gears, respectively, comprising a second pair of helical worm gear elements rotatable with said first helical worm gear elements, respectively, and meshing with said helical worm gears, respectively, whereby when the rotational resistance of the coaxially aligned gears is equalized the end thrust on said helical worm gear elements is equalized and there is no end thrust either on said worm gear elements or on said coaxially aligned gears and whereby when the rotational resistance of the coaxially aligned gears is unequalized an unequalized thrust results on said worm gear elements and on said coaxially aligned gears, and cone bearing friction coupler elements in force transmission relation to said worm gear elements forced into coupling engagement by said unequalized end thrust and released from said coupling engagement by said equalized end thrust.

5. A non-equalizing-torque differential gearing comprising a laterally extending axle, a pair of hubs mounted side by side to rotate about said axle, a pair of gears, one rotatable with each hub, a gear carrier mounted to rotate about said axle, and a locking differential gearing on said gear carrier meshing with said pair of gears operating to lock either one of said gears to said gear carrier when the other gear has no tractive effect.

6. A non-equalizing-torque differential gearing comprising a laterally extending axle, a pair of hubs mounted side by side to rotate about said axle, a pair of gears, one rotatable with each hub, a gear carrier mounted to rotate about said axle, a locking differential gearing on said gear carrier meshing with said pair of gears, and brake means acting on said gear carrier operating to lock either one of said gears to said gear carrier when the other gear has no tractive effect.

RALPH R. RANDALL.

REFERENCES CITED

The following references are of record in the file of this patent:

UNITED STATES PATENTS

| Number | Name | Date |
| --- | --- | --- |
| 1,959,147 | Angell | May 15, 1934 |
| 1,994,719 | Lichty | Mar. 19, 1935 |
| 2,000,223 | Du Pras | May 7, 1935 |
| 2,267,362 | Ash | Dec. 23, 1941 |

FOREIGN PATENTS

| Number | Country | Date |
| --- | --- | --- |
| 27,123 | Great Britain | Dec. 4, 1941 |